R. F. GOECKE.
CONDENSER.
APPLICATION FILED JULY 29, 1918.

1,399,611.

Patented Dec. 6, 1921.

INVENTOR
Rudolf F Goecke
BY F.O. Richey
His ATTORNEY

UNITED STATES PATENT OFFICE.

RUDOLF F. GOECKE, OF ELYRIA, OHIO.

CONDENSER.

1,399,611.  Specification of Letters Patent.  Patented Dec. 6, 1921.

Application filed July 29, 1918. Serial No. 247,104.

*To all whom it may concern:*

Be it known that I, RUDOLF F. GOECKE, a citizen of the United States, residing at Elyria, in the county of Lorain and State of Ohio, have invented certain new and useful Improvements in Condensers; and I do hereby declare the following to be a full, clear, and exact description of the invention, such as will enable others skilled in the art to which it appertains to make and use the same.

My invention relates to improvements in condensers, which, though capable of more general uses, are of especial utility in connection with the condensation of vapors, such as are best condensed in enameled wares.

Among the objects of my invention are the provision of increased surfaces to be exposed to the cooling mediums, and which will be compact and easy and cheap to make. I also aim to produce a condenser whose parts may be made of cast iron, and which are so shaped that they can be easily and conveniently enameled, and which can be easily assembled and disassembled for purposes of inspection, repair and substitution of new parts.

These and other objects of my invention and the invention itself will be understood from a description of an embodiment of the invention.

Figure 2:
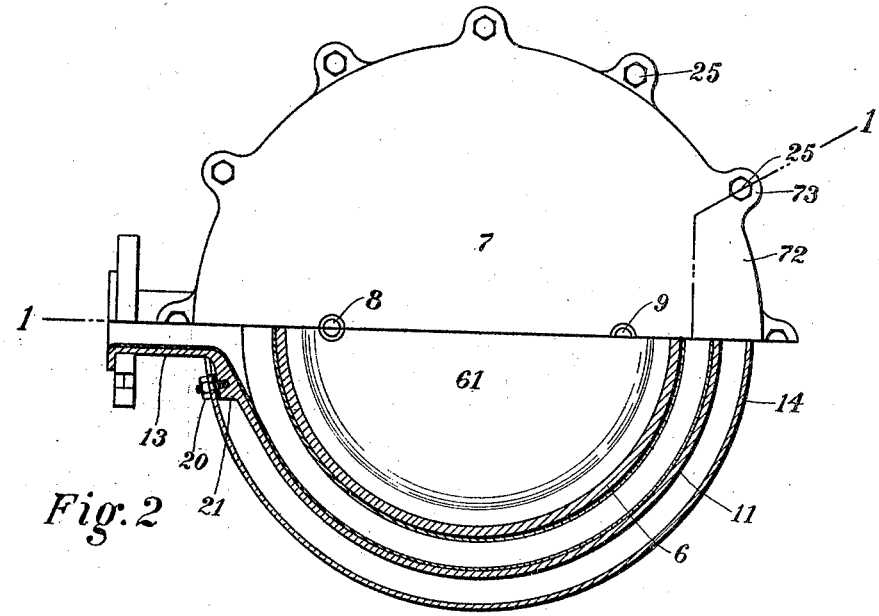
Fig. 2 is a view part in top plan and part in section, taken along the line 2—2 of Fig. 1.
Figure 1:
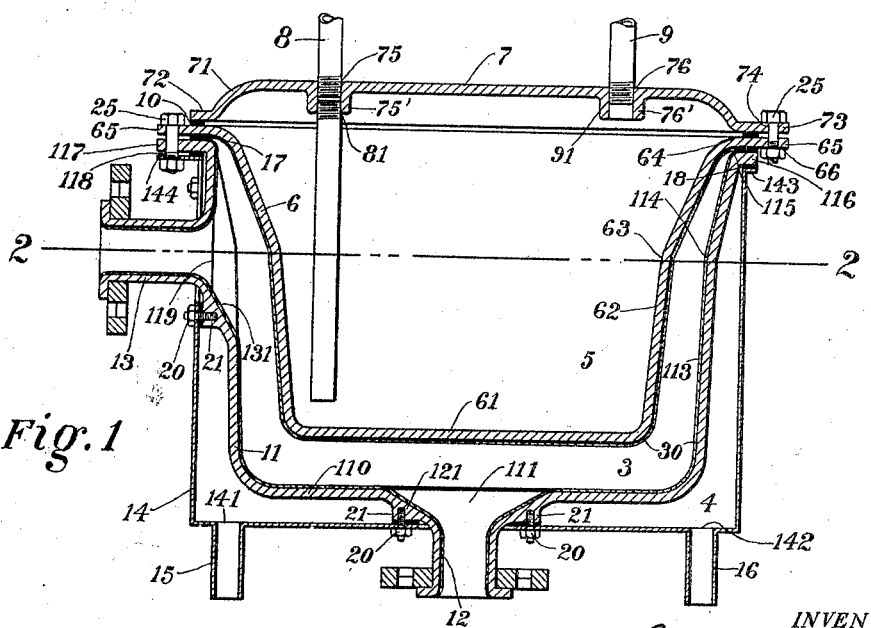
Figure 1 is a section of an embodiment of my invention taken along the line 1—1 of Fig. 2.

Referring now to the drawings, and to the embodiment of the invention illustrated therein, at 3 is shown the condensing chamber in which the vapors are to be condensed. At 4 is shown one of the chambers for the cooling medium and at 5 is shown a second chamber for the cooling medium. At 6 is shown a vessel which is preferably cylindrical or substantially cylindrical in form, and which constitutes the major portion of the walls of the chamber 5. In the embodiment shown, the vessel 6 is provided with a bottom 61, which is flat, and with side walls 62, slightly flared outwardly as the walls extend upwardly to a point 63, whence they are flared outwardly and upwardly to the rim 64, where the walls are turned outwardly to form a flange provided with a plurality of ears 65, which are perforated, as shown at 66, for a purpose to be described.

The top of the vessel 6 is closed by a lid 7, which in the embodiment shown is turned over and downwardly at 71, and which is provided with a flange 72 from which perforated ears 73 project at intervals. The ears 73 are perforated at 74, and are employed in connection with the connecting of the various pieces of the apparatus together. The top 7 is provided with openings 75 and 76, which may be surrounded with inwardly extending bushings 75' 76'. Ducts 8 and 9 lead through the openings 75 and 76, and serve to introduce to and withdraw the cooling medium from the chamber 5. The ducts may be fastened in the openings by any suitable means, such as by threads 81 and 91. I find it best to place a ring of insulating material 10 between the flanges 72 and 65.

At 11 is shown a second vessel, which is of substantially the same shape as the vessel 6, but which is so much greater in size as to leave a suitable chamber 3 between the vessels 6 and 11. The bottom 110 of the vessel 11 is substantially flat, and is provided with an opening 111 from which a spout 12 projects. In the embodiment shown the sides 113 of the vessel 11 are slightly flared up to a point 114, whence the flare increases to the rim 115. An outwardly turned flange 116 is formed upon the rim of the vessel 11, and from this rim there project a plurality of ears 117 perforated at 118 for the connecting means.

The side walls 113 are provided with an opening 119 for a spout 13, which extends outwardly from the side walls of the vessel 11. The spouts 12 and 13 are employed for introducing and withdrawing fluids to and from the chamber 3. I prefer to flare the spouts as indicated at 121 and 131 where such spouts join the vessel.

At 14 is shown an outer vessel or jacket, which in the embodiment shown is cylindrical in form, and which surrounds the vessel 11. The ducts 15 and 16 communicate with the inside of the vessel through openings 141 and 142. The ducts 15 and 16 are employed for introducing and withdrawing the cooling medium to and from the chamber 4. A flange 143 is provided about the rim of the jacket 14, and a plurality of ears 144 project from this rim. Insulating means is placed between the various flanges, as indicated at 10, 17 and 18. The jacket 14 is connected to the vessel 11 by suitable connecting means, such as bolts 20 driven into shoulders 21 about the spouts 12 and 13, and the jacket, the two vessels and the lid are connected together by suitable means, such as bolts 25 passing through the ears formed upon these various members.

The cooling medium is introduced to and withdrawn from the chambers 4 and 5 through the tubes communicating with such chambers and the vapors entering one of the spouts is distributed in the chamber 3 and exposed to the walls thereof until condensed, passing out through the other spout. In the embodiment shown, the vapors would naturally enter through the spout 13 and be withdrawn through the spout 14. The outer wall of the vessel 6 and the inner wall of the vessel 11 are preferably enameled, especially when the vapors which attack the material of which these vessels are made is employed.

It will be seen that I have produced a condenser which is very compact, and yet in which a large surface area is exposed to the cooling mediums. It will also be seen that the apparatus can be easily assembled and disassembled, and when so assembled and disassembled, there will be a minimum danger of injuring the enamel. The ease with which the apparatus can be assembled and disassembled greatly facilitates the manufacture of the apparatus, the substitution of new parts and the inspection and repair.

I have shown this particular embodiment of my invention and the details thereof for the purpose of better describing the invention. It will be understood that numerous and extensive departures may be made from the particular form and details of this embodiment, without departing from the spirit of the invention.

I claim:—

1. In a condenser, the combination of a condensing chamber formed of two differently sized nested vessels connected together at their top edges, a jacket about the larger vessel and a cover for the inner vessel, a coat of enamel on the inner wall of the larger vessel and the outer wall of the smaller vessel, and tubes passing through the jacket walls and communicating with the condensing chamber through which vapors may be introduced to and withdrawn from the chamber.

2. A vessel having an open top and an outwardly extending flange therearound, said vessel having openings in the side adjacent the top and in the bottom, a second vessel inside the first vessel having an open top and an outwardly extending flange therearound, spouts on the side and bottom of said second vessel extending through said openings, a third vessel in the second vessel having an open top and an outwardly extending flange, said vessels being proportioned to provide spaces on each side of the second vessel when said flanges are in substantial engagement, a lid on said third vessel, pipes connecting with the space in the third vessel through said lid, pipes connecting with the space between the first and second vessel, means for clamping said flanges together and means for clamping the first vessel to the second vessel around said spouts.

In witness whereof, I have hereunto set my hand this 24th day of July, 1918.

RUDOLF F. GOECKE.